United States Patent
Takahashi et al.

(10) Patent No.: US 7,493,200 B2
(45) Date of Patent: Feb. 17, 2009

(54) AUTOMATIC BRAKE SYSTEM FOR A VEHICLE

(75) Inventors: Seiki Takahashi, Kanagawa (JP); Minoru Tamura, Yokohama (JP); Yoshinori Yamamura, Yokohama (JP); Yoji Seto, Kanagawa (JP); Masahide Nakamura, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 287 days.

(21) Appl. No.: 10/782,813

(22) Filed: Feb. 23, 2004

(65) Prior Publication Data

US 2004/0193351 A1 Sep. 30, 2004

(30) Foreign Application Priority Data

Mar. 28, 2003 (JP) ............................. 2003-092160

(51) Int. Cl.
B62D 6/00 (2006.01)
G06F 7/00 (2006.01)
B06T 7/12 (2006.01)

(52) U.S. Cl. ........................... 701/41; 701/70; 180/167

(58) Field of Classification Search .................. 701/70, 701/72, 78, 79, 80, 300, 301, 93, 96; 303/146, 303/148, 149, 155; 340/425.5, 436, 438, 340/901, 902; 180/167, 169

See application file for complete search history.

(56) References Cited

U.S. PATENT DOCUMENTS

| | | | | |
|---|---|---|---|---|
| 5,510,990 A | * | 4/1996 | Hibino et al. ................. 701/96 |
| 5,529,138 A | * | 6/1996 | Shaw et al. .................. 180/169 |
| 5,530,651 A | * | 6/1996 | Uemura et al. .............. 701/301 |
| 5,540,298 A | * | 7/1996 | Yoshioka et al. ............ 180/169 |
| 5,574,644 A | * | 11/1996 | Butsuen et al. ............... 701/93 |
| 5,576,959 A | * | 11/1996 | Hrovat et al. ................. 701/70 |
| 5,995,037 A | * | 11/1999 | Matsuda et al. ............... 342/71 |
| 6,157,892 A | * | 12/2000 | Hada et al. .................. 701/301 |
| 6,567,749 B2 | * | 5/2003 | Matsuura .................... 701/301 |
| 6,926,374 B2 | * | 8/2005 | Dudeck et al. .............. 303/191 |
| 2002/0091479 A1 | * | 7/2002 | Maruko et al. ............... 701/96 |
| 2002/0156581 A1 | * | 10/2002 | Matsuura .................... 701/301 |
| 2003/0067219 A1 | | 4/2003 | Seto et al. |

FOREIGN PATENT DOCUMENTS

| JP | 6-298022 A | 10/1994 |
|---|---|---|
| JP | 2003-112618 A | 4/2003 |
| JP | 2003-182544 A | 7/2003 |

* cited by examiner

*Primary Examiner*—Edward Pipala
(74) *Attorney, Agent, or Firm*—Foley & Lardner LLP

(57) ABSTRACT

An automatic brake system for a vehicle is disclosed. Based on a possibility that a potential collision with an obstacle preceding the vehicle can avoided by braking, and a possibility that the potential collision can be avoided by steering, the system automatically controls a braking operation for collision-avoidance. A condition of starting the automatic braking operation and a characteristics of the operation are determined based on calculation or estimation of a condition of the path where the vehicle is traveling, such as a relative speed, widths of spaces on sides of the obstacle, and steering characteristics.

21 Claims, 7 Drawing Sheets

AUTOMATIC BRAKE SYSTEM FOR A VEHICLE

BACKGROUND OF THE INVENTION

The present invention relates generally to a collision-avoidance system for a vehicle, and more particularly to an active collision-avoidance system employing an automatic brake system for a vehicle.

Recent years, there have been disclosed various automatic brake systems for collision-avoidance. One such system is disclosed in Japanese Patent Provisional Publication No. 6-298022 published Oct. 25, 1994. In the system of this publication, a first minimum safety distance in which a collision can be avoided by a brake pedal operation and a second minimum safety distance in which a collision can be avoided by a steering wheel operation are both calculated for an obstacle preceding the host vehicle. When a detected distance between the host vehicle and the obstacle is smaller than both the first and second minimum safety distances, an automatic braking control is operated. In other words, possibilities of collision-avoidance by steering and by braking are determined based on the first and second distances. When the collision-avoidances by steering and by braking are both impossible, an automatic braking control is operated to prevent a collision. In this way, an unnecessary automatic braking is avoided when a driver intends to avoid a collision with a obstacle by braking or by steering.

SUMMARY OF THE INVENTION

In the aforementioned automatic brake system, the minimum safety distance in which a collision can be avoided by steering is calculated from a geometrical relationship, assuming a lateral acceleration of the host vehicle as a constant. However, the actual steering characteristics is determined by tire characteristics, yaw directional moment of inertia, vehicle weight, vehicle speed, wheelbase, tread, and steering characteristics dependent on manual steering operation of a driver. Although the actual steering characteristics is thus determined, the lateral acceleration of the host vehicle is handled as a constant in the system. Consequently, the minimum safety distance estimated in the system may be longer or shorter than the actual value.

Accordingly, it is an object of the present invention to provide an automatic brake system for a vehicle which can control a braking operation to avoid a potential collision with a forward obstacle at an optimal timing based on estimation of a possibility of a steering-based collision avoidance.

In order to accomplish the aforementioned and other objects of the present invention, an automatic brake system for a vehicle comprises a forward-monitoring unit that automatically detects an obstacle preceding the vehicle, and a control unit that executes an automatic braking control operation to avoid a potential collision with the obstacle, based on a steering characteristics of the vehicle.

According to another aspect of the invention, an automatic brake system for a vehicle comprises, forward-monitoring means for automatically detecting an obstacle preceding the vehicle, and control means for executing an automatic braking control operation to avoid a potential collision with the obstacle, based on a steering characteristics of the vehicle.

According to a further aspect of the invention, a method of controlling a braking operation of a vehicle, the method comprises monitoring a condition of a path where the vehicle is traveling, for detecting an obstacle preceding the vehicle, and executing an automatic braking control operation to avoid a potential collision with an obstacle based on a steering characteristics of the vehicle, when the obstacle is detected.

According to a still further aspect of the invention, an automatic brake system for a vehicle comprises a forward-monitoring unit that automatically detects an obstacle preceding the vehicle, and a geometrical relationship among the vehicle, the obstacle and a path where the vehicle is traveling, a control unit that executes an automatic braking control operation to avoid a potential collision with the obstacle, based on a steering characteristics of the vehicle and the geometrical relationship, and a brake control unit that generates a braking force according to the automatic braking control operation determined by the control unit.

According to another aspect of the invention, an automatic brake system for a vehicle comprises a forward-monitoring means for automatically detecting an obstacle preceding the vehicle, and a geometrical relationship among the vehicle, the obstacle and a path where the vehicle is traveling, a control means for executing an automatic braking control operation to avoid a potential collision with the obstacle, based on a steering characteristics of the vehicle and the geometrical relationship, and a brake control means for generating a braking force according to the automatic braking control operation determined by the control means.

According to another aspect of the invention, a method of controlling a braking operation of a vehicle, the method comprises monitoring a condition of a path where the vehicle is traveling, for detecting an obstacle preceding the vehicle, detecting a geometrical relationship among the vehicle, an obstacle and the path, when the obstacle is detected, determining a steering characteristics of the vehicle, based on the geometrical relationship and the change of the geometrical relationship, determining a first possibility that the vehicle can avoid the potential collision with the obstacle by steering, based on the steering characteristics, the geometrical relationship and the change of the geometrical relationship, determining a second possibility that the vehicle can avoid the potential collision with the obstacle by braking, based on the geometrical relationship and the change of the geometrical relationship, and braking by a predetermined characteristics of braking operation suitable for a combined condition of the first possibility and the second possibility.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
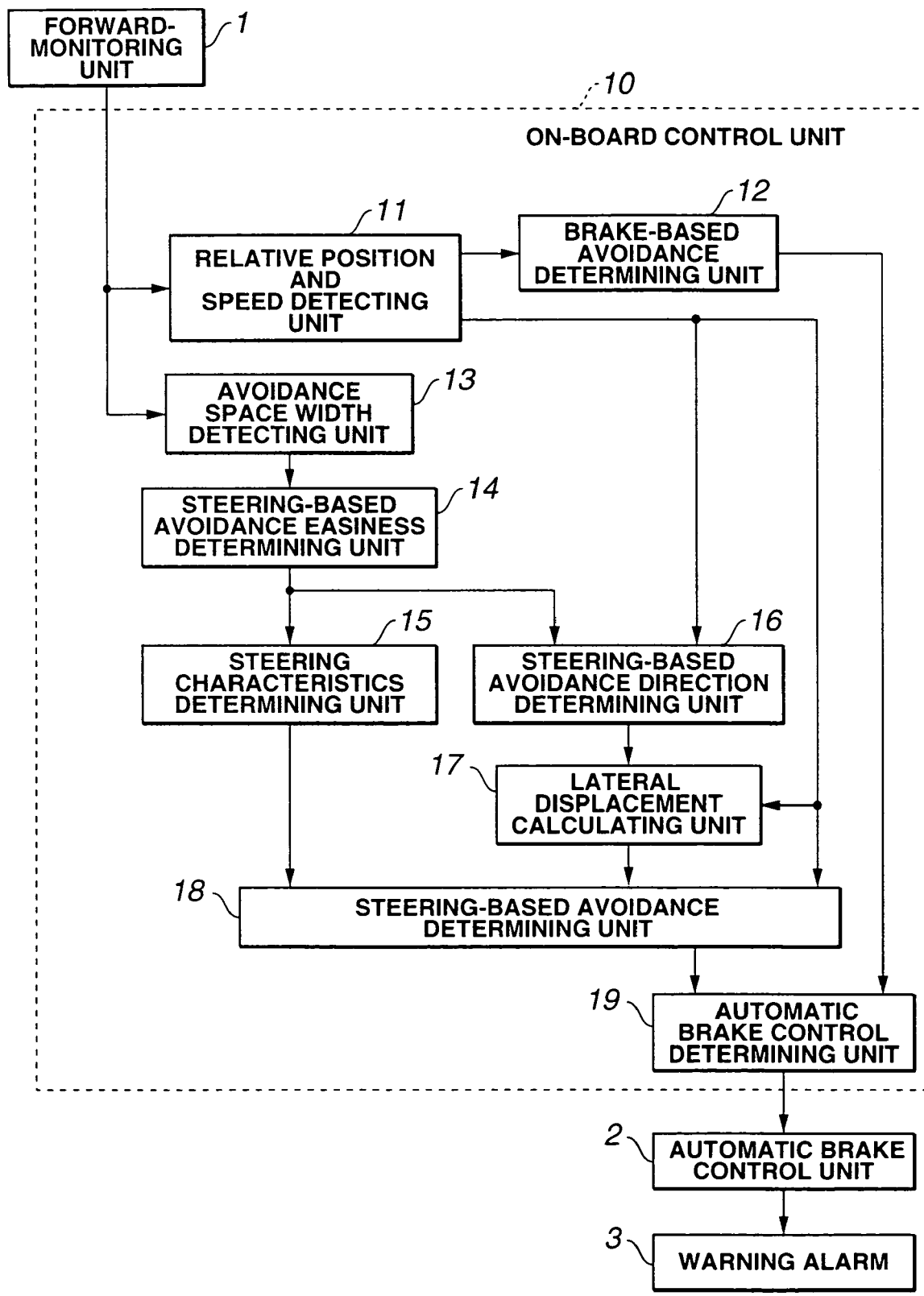
FIG. 1 is a block diagram depicting a configuration of an automatic brake system for a vehicle of an embodiment of the present invention.

Referring now to FIG. 1, there is shown the structure of an automatic brake system for a vehicle. As shown in FIG. 1, the automatic brake system for a vehicle includes a forward-monitoring unit 1, an on-board control unit 10, an automatic brake control unit 2 and a warning alarm 3. On-board control unit 10 includes a relative position and speed detecting unit 11, a brake-based avoidance determining unit 12, an avoidance space width detecting unit 13, a steering-based avoidance easiness determining unit 14, a steering characteristics determining unit 15, a steering-based avoidance direction determining unit 16, a lateral displacement calculating unit 17, a steering-based avoidance determining unit 18, and an automatic brake control determining unit 19.

Forward-monitoring unit 1 monitors a road condition in front of the host vehicle. A geometrical relationship among the vehicle, an obstacle and a path where the vehicle is traveling, is detected. For example, forward-monitoring unit 1 consists of a scanning laser radar sensor. Forward-monitoring unit 1 outputs detected or monitored information to relative position and speed detecting unit 11 and avoidance space width detecting unit 13 of on-board control unit 10.

Based on the detected information from forward-monitoring unit 1, relative position and speed detecting unit 11 detects or calculates a longitudinal distance, a lateral offset, and a vehicle speed relative to a forward obstacle or a obstacle preceding the host vehicle. The relative speed may be derived by differentiation or band-pass filter operation of the longitudinal distance. Relative position and speed detecting unit 11 outputs the detected or calculated information to brake-based avoidance determining unit 12, steering-based avoidance direction determining unit 16, lateral displacement calculating unit 17, and steering-based avoidance determining unit 18.

Brake-based avoidance determining unit 12 determines whether a potential collision with the obstacle can be avoided by braking or not, based on the output from relative position and speed detecting unit 11. Brake-based avoidance determining unit 12 outputs the determination to automatic brake control determining unit 19.

Avoidance space width detecting unit 13 detects or calculates widths of avoidance spaces, based on the longitudinal distance and the lateral offset sent from forward-monitoring unit 1. The avoidance spaces are on the sides of the forward obstacle where the host vehicle avoids a collision by steering. Avoidance space width detecting unit 13 outputs the detected widths of the avoidance spaces on the sides of the obstacle to steering-based avoidance easiness determining unit 14.

Steering-based avoidance easiness determining unit 14 estimates a degree of easiness of steering-based collision avoidance to each direction, based on the width of the avoidance space on each side of the obstacle. In addition, steering-based avoidance easiness determining unit 14 categorizes the degree of easiness of steering-based collision avoidance into levels. Specifically, there are three levels, that is, the first level representing "steering-based collision avoidance is easy", the second level representing "steering-based collision avoidance is difficult", and the third level representing "steering-based collision avoidance is impossible." Steering-based avoidance easiness determining unit 14 outputs the level of the degree of easiness of steering-based collision avoidance to steering characteristics determining unit 15 and steering-based avoidance direction determining unit 16.

Steering characteristics determining unit 15 determines or selects an assumption of the steering characteristics dependent on manual steering operation of a driver in steering-based collision avoidance, based on the degree of easiness of steering-based collision avoidance from steering-based avoidance easiness determining unit 14. Steering characteristics determining unit 15 outputs the determination to steering-based avoidance determining unit 18.

Steering-based avoidance direction determining unit 16 receives the output from relative position and speed detecting unit 11 in addition to the degree of easiness of steering-based collision avoidance from steering-based avoidance easiness determining unit 14. Steering-based avoidance direction determining unit 16 determines the optimal direction of steering-based collision avoidance, based on the degree of easiness of steering-based collision avoidance from steering-based avoidance easiness determining unit 14 and the output from relative position and speed detecting unit 11. Steering-based avoidance direction determining unit 16 outputs the determined direction to lateral displacement calculating unit 17.

Lateral displacement calculating unit 17 receives the output from relative position and speed detecting unit 11 in addition to the determination from steering-based avoidance direction determining unit 16. Lateral displacement calculating unit 17 calculates a required lateral displacement in steering-based collision avoidance, based on the determination of steering-based avoidance direction determining unit 16, and the detected information of relative position and speed detecting unit 11. Lateral displacement calculating unit 17 outputs the calculated lateral displacement to steering-based avoidance determining unit 18.

Steering-based avoidance determining unit 18 receives the determination from steering characteristics determining unit 15 and the detected information from relative position and speed detecting unit 11, in addition to the lateral displacement from lateral displacement calculating unit 17. Steering-based avoidance determining unit 18 determines whether a collision with the obstacle can be avoided by steering or not, based on these inputs. Steering-based avoidance determining unit 18 outputs the determination to automatic brake control determining unit 19.

Automatic brake control determining unit 19 receives the determination from brake-based avoidance determining unit 12, in addition to the determination from steering-based avoidance determining unit 18. Automatic brake control determining unit 19 determines whether an automatic braking control for collision-avoidance should be operated or not, based on these inputs. Based on the determination, automatic brake control determining unit 19 outputs a start signal of the automatic braking control to automatic brake control unit 2.

Automatic brake control unit 2 starts automatic braking operation or generates a braking force, based on the start signal from automatic brake control determining unit 19 of on-board control unit 10. When automatic brake control unit 2 starts an automatic braking operation, warning alarm 3 warns a driver of the brake operation. For instance, warning alarm 3 operates at a timing when automatic brake control unit 2 inputs the start signal.

Figure 2:
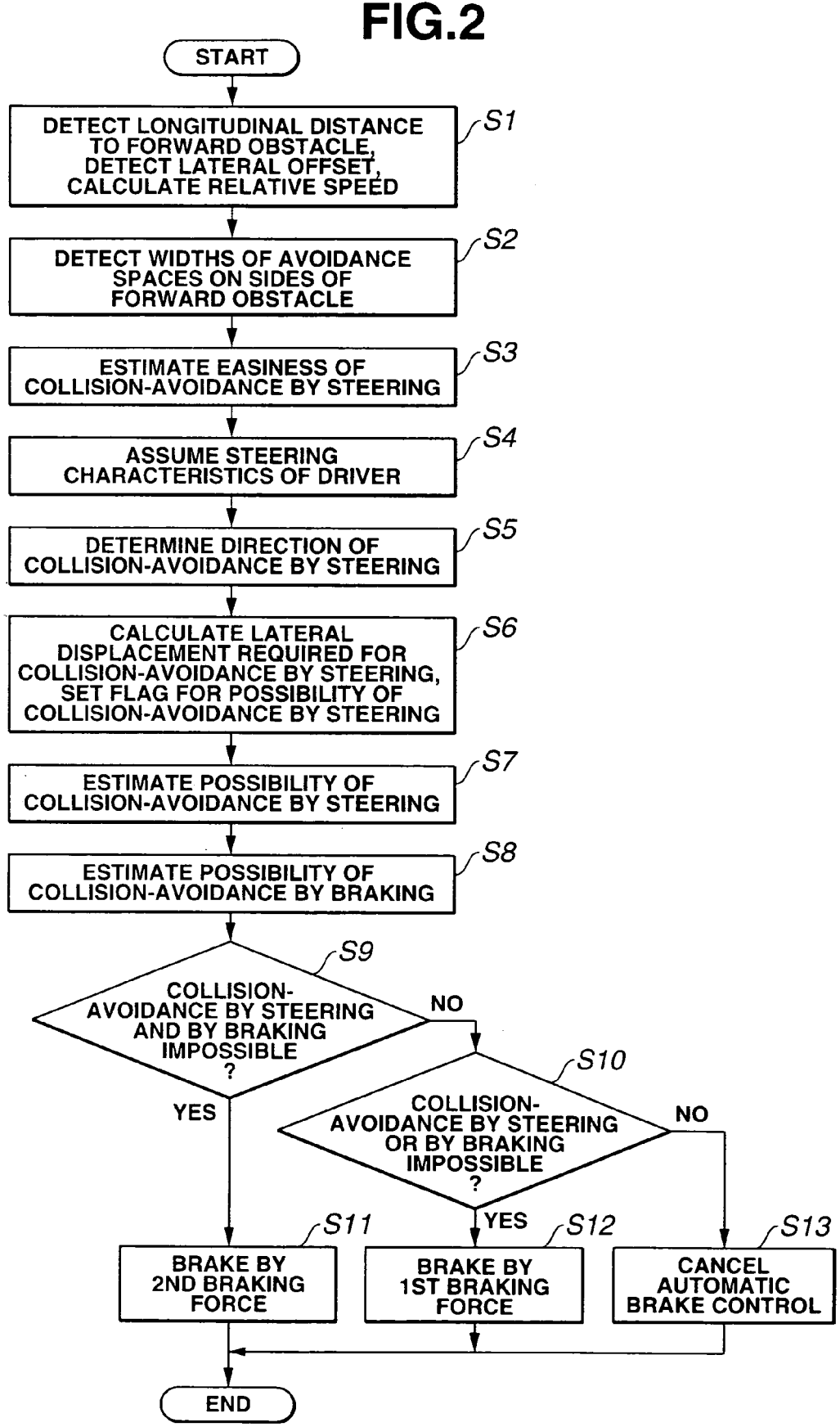
FIG. 2 is a flow chart depicting an operational procedure of the automatic brake system.

The automatic brake system for a vehicle consists as above described. FIG. 2 shows the operational procedure executed by the automatic brake system for a vehicle. This operational procedure is described, and the operation of each element is more specifically described as follows.

Figure 3:
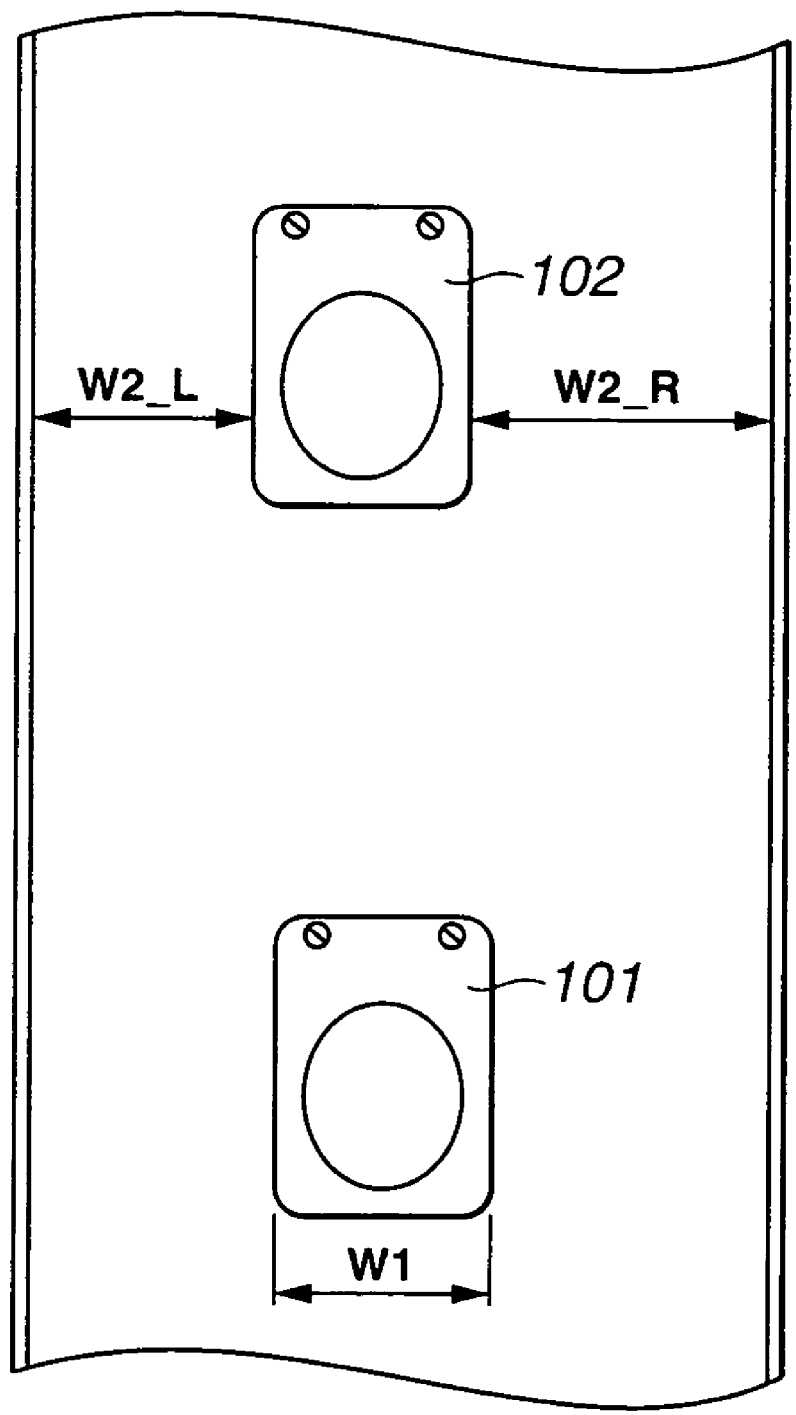
FIG. 3 is a sketch depicting a road condition where a possibility of collision-avoidance is estimated by the automatic brake system in the embodiment.

First, in step S1, a longitudinal distance relative to a obstacle preceding the host vehicle, or a distance between the front end of the host vehicle and the rear end of an obstacle, and a lateral offset relative to the obstacle, or a distance between a longitudinal center line of the host vehicle and that of the obstacle are detected. Based on the detected information, a relative speed is calculated. In detail, forward-monitoring unit 1 detects a road condition in front of the host vehicle. A geometrical relationship among the vehicle, an obstacle and a path where the vehicle is traveling, is detected. The monitored or detected information by forward-monitoring unit 1 is shown in FIG. 3. FIG. 3 is a road condition applied to the embodiment. As shown in FIG. 3, a preceding vehicle as a forward obstacle 102 is traveling in front of the host vehicle 101. The vehicle width of host vehicle 101 is W1. There is a space with a width of W2_L to the left of preceding vehicle 102 and a space with a width of W2_R to the right of preceding vehicle 102. Forward-monitoring unit 1 detects or scans a forward state and outputs the detected information to relative position and speed detecting unit 11.

Figure 4:
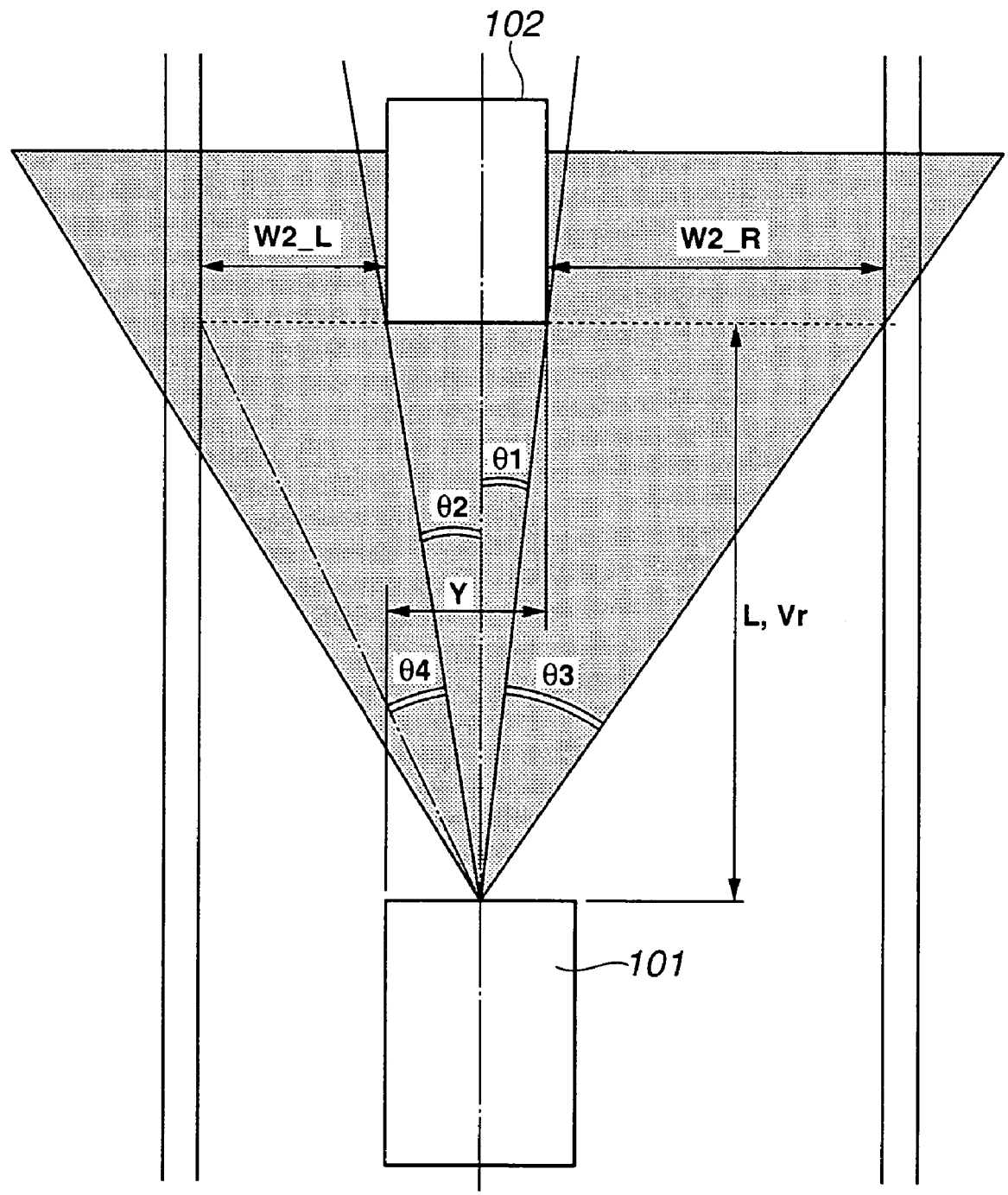
FIG. 4 is a sketch depicting an operation of a forward-monitoring unit of the automatic brake system.

Relative position and speed detecting unit 11 derives information according to the detected information from front forward-monitoring unit 1 as follows. FIG. 4 shows a road condition as in the case of FIG. 3. There are also shown the derived information of relative position and speed detecting unit 11 and that of avoidance space width detecting unit 13. Relative position and speed detecting unit 11 measures the longitudinal distance L between host vehicle 101 and forward obstacle or preceding vehicle 102. Relative position and speed detecting unit 11 calculates the relative speed $V_r$, based on longitudinal distance L. Relative position and speed detecting unit 11 also measures an angle θ1 between the center line and a line connecting the lateral center of the front of host vehicle 101 and the right edge of forward obstacle 102, and an angle θ2 between the center line and a line connecting the lateral center of the front of host vehicle 101 and the left edge of forward obstacle 102. For example, as shown in FIG. 4, angles θ1 and θ2 are measured with reference to the rear end of forward obstacle 102. Relative position and speed detecting unit 11 derives an offset distance relative to forward obstacle 102 from angles θ1 and θ2.

In step S2, the widths of the avoidance spaces on the sides of forward obstacle 102 are detected based on the output from forward-monitoring unit 1. Specifically, avoidance space width detecting unit 13 measures an angle θ3 between the right end of the road and the right edge of forward obstacle 102, and an angle θ4 between the left end of the road and the left edge of forward obstacle 102, in addition to angles θ1 and θ2. For instance, as shown in FIG. 4, angles θ3 and θ4 are measured with reference to the rear end of forward obstacle 102. Based on the measured angles θ1 to θ4, avoidance space width detecting unit 13 calculates widths W2_L and W2_R of avoidance spaces on the sides of forward obstacle 102. These widths are hereinafter referred as left avoidance space width W2_L and right avoidance space width W2_R.

In step S3, the degree of easiness of steering-based collision avoidance is estimated or determined. Steering-based avoidance easiness determining unit 14 estimates the degree of easiness of the steering-based collision avoidance with which the host vehicle avoids the obstacle by steering, based on avoidance space widths W2_L and W2_R detected in step S2. Specifically, the degree of easiness of steering-based collision avoidance is estimated by comparing the width of the host vehicle W1 with left avoidance space width W2_L and with right avoidance space width W2_R. The degree of easiness of steering-based collision avoidance is categorized into levels according to the comparison for each side. As described above, there are three levels, that is, the first level representing "steering-based collision avoidance is easy", the second level representing "steering-based collision avoidance is difficult", and the third level representing "steering-based collision avoidance is impossible."

The categorization is operated according to the comparison between left avoidance space width W2_L and host vehicle width W1 as follows in detail. When left avoidance space width W2_L is over twice wider than host vehicle width W1, it is estimated that the host vehicle can easily pass through left avoidance space width W2_L, and a collision can be avoided to the left by steering. Accordingly, L=1 is set, which means left avoidance space width W2_L is estimated as the first level. When left avoidance space width W2_L is wider than host vehicle width W1 but not over twice wider, it is estimated that the host vehicle can pass through left avoidance space width W2_L, but with difficulty, and steering-based collision avoidance to the left is difficult. Accordingly, L=2 is set, which means left avoidance space width W2_L is estimated as the second level. When left avoidance space width W2_L is narrower than host vehicle width W1, it is estimated that the host vehicle can not pass through left avoidance space width W2_L, and a collision can not be avoided to the left by steering. Accordingly, L=3 is set, which means left avoidance space width W2_L is estimated as the third level. In this way, the degree of easiness of steering-based collision avoidance is categorized according to the comparison between left avoidance space width W2_L and host vehicle width W1.

Similar categorization is operated according to the comparison between right avoidance space width W2_R and host vehicle width W1, in the case of avoidance to the right direction, as follows. When right avoidance space width W2_R is over twice wider than host vehicle width W1, it is estimated the host vehicle can easily pass through right avoidance space width W2_R, and a collision can be avoided to the right by steering. Accordingly, R=1 is set, which means right avoidance space width W2_R is estimated as the first level. When right avoidance space width W2_R is wider than host vehicle width W1 but not over twice wider, it is estimated that the host vehicle can pass through right avoidance space width W2_R, but with difficulty, and steering-based collision avoidance to the right is difficult. Accordingly, R=2 is set, which means right avoidance space width W2_R is estimated as the second level. When right avoidance space width W2_R is narrower than host vehicle width W1, it is estimated that the host vehicle can not pass through right avoidance space width W2_R, and a collision can not be avoided to the right by steering. Accordingly, R=3 is set, which means right avoidance space width W2_R is estimated as the third level. In this way, the degree of easiness of steering-based collision avoidance is categorized according to the comparison between right avoidance space width W2_R and host vehicle width W1.

In step S4, the steering characteristics dependent on manual steering operation of a driver is determined. Steering characteristics determining unit 15 assumes a manual operation of a driver by which the host vehicle avoids a collision to each direction, based on the estimated degree of easiness of steering-based collision avoidance in step S3. The steering characteristics is determined or selected according to the assumed manual operation.

Figure 5:
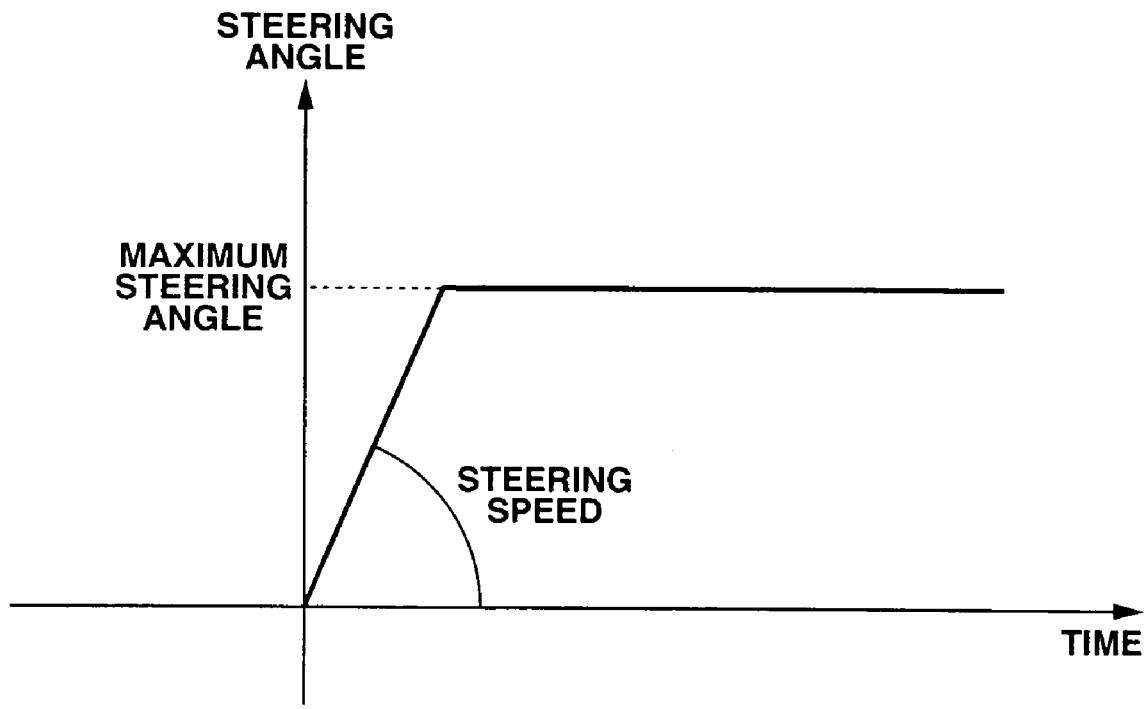
FIG. 5 is a characteristic diagram depicting a steering characteristics dependent on manual steering operation selected based on a degree of easiness of steering-based collision avoidance.

For example, when the degree of easiness of steering-based collision avoidance is "steering-based collision avoidance is easy" as the first level, it is assumed that a driver steers with no hesitation. A steering characteristics which generates a large steering amount in a short time is selected or determined accordingly as shown in FIG. 5. In other words, a steering characteristic with which a maximum steering angle is large and steering speed is fast, is determined.

Figure 6:
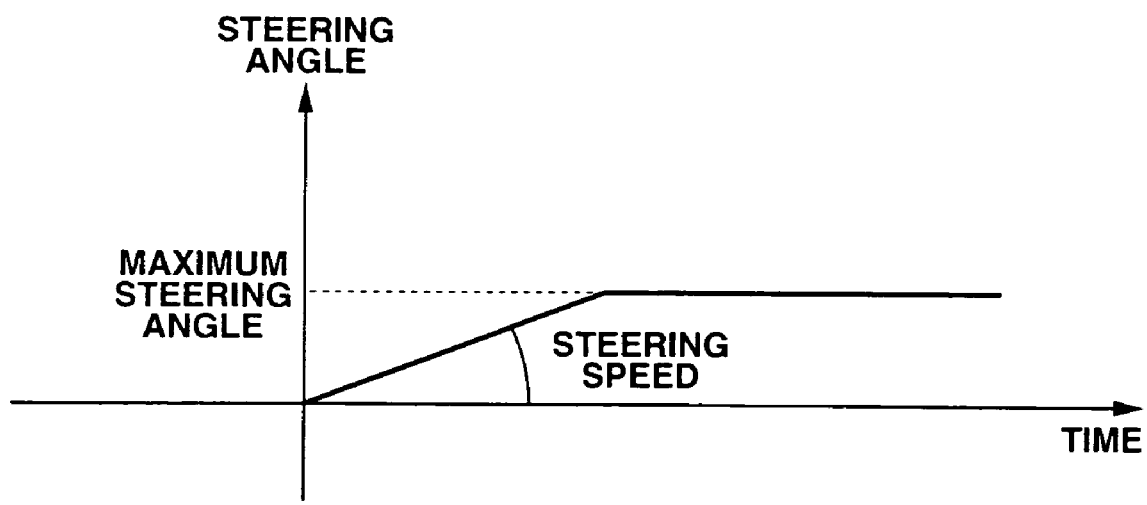
FIG. 6 is a characteristic diagram depicting another steering characteristics dependent on manual steering operation selected based on a degree of easiness of steering-based collision avoidance.

When the degree of easiness of steering-based collision avoidance is "steering-based collision avoidance is difficult" as the second level, it is assumed that steering operation is slow with some hesitation. A steering characteristics which does not generate a large steering amount even in a long time is selected as shown in FIG. 6. In other words, a steering characteristic with which a maximum steering angle is small and steering speed is slow, is determined.

As described above, steering characteristics dependent on manual steering operation of a driver is determined based on the degree of easiness of steering-based collision avoidance. The degree of easiness of steering-based collision avoidance is determined based on avoidance space widths in the both sides W2_L and W2_R, that is, the road condition in front of the host vehicle. In summary, the steering characteristics dependent on manual steering operation of a driver is determined based on the road condition of the host vehicle or condition of the path where the vehicle is traveling. The criteria or the threshold of the categorization of the degree of easiness of steering-based collision avoidance and the steering characteristics may be derived or adjusted in experiment. Re-adjustment of the threshold value may be made by way of learning regulation or learning control.

In step S5, the direction of steering-based collision avoidance is determined. Steering-based avoidance direction determining unit 16 determines which direction is proper for avoiding a collision with a obstacle by steering, based on the lateral offset derived in step S1 and the degree of easiness of steering-based collision avoidance derived in S3.

In the positional relationship between host vehicle 101 and forward obstacle 102 as shown in FIG. 4, the comparison between angles θ1 and θ2 indicates that host vehicle 101 is offset to the right relative to forward obstacle 102. In this case, host vehicle 101 can avoid a collision with a smaller lateral displacement by selecting the right direction than the left direction. In this way, the direction where a collision can be avoided can be selected or determined based on the lateral displacement which is estimated from the lateral offset. In other words, a suitable direction which enables a collision-avoidance can be determined based on the comparison between angles θ1 and θ2.

In step S5, the direction of steering-based collision avoidance is finally determined in consideration of the degree of easiness of steering-based collision avoidance in addition to the lateral offset. When host vehicle 101 can avoid a collision with a smaller lateral displacement by selecting the right direction than the left direction, the direction of steering-based collision avoidance is determined based on the degree of easiness of steering-based collision avoidance as follows. As described above, the degree of easiness of steering-based collision avoidance for the left direction is L=1, L=2, or L=3 according to the comparison between left avoidance space width W2_L and host vehicle width W1. Similarly, the degree of easiness of steering-based collision avoidance for the right direction is R=1, R=2, or R=3 according to the comparison between right avoidance space width W2_R and host vehicle width W1.

When the degree of easiness of steering-based collision avoidance is L=1 and R=1, the steering-based collision avoidance to the right is determined as proper. When the degree of easiness of steering-based collision avoidance is L=1 and R=2, the steering-based collision avoidance to the left is determined as proper. When the degree of easiness of steering-based collision avoidance is L=1 and R=3, the steering-based collision avoidance to the left is determined as proper. When the degree of easiness of steering-based collision avoidance is L=2 and R=1, the steering-based collision avoidance to the right is determined as proper. When the degree of easiness of steering-based collision avoidance is L=2 and R=2, the steering-based collision avoidance to the right is determined as proper. When the degree of easiness of steering-based collision avoidance is L=2 and R=3, the steering-based collision avoidance to the left is determined as proper. When the degree of easiness of steering-based collision avoidance is L=3 and R=1, the steering-based collision avoidance to the right is determined as proper. When the degree of easiness of steering-based collision avoidance is L=3 and R=2, the steering-based collision avoidance to the right is determined as proper. When the degree of easiness of steering-based collision avoidance is L=3 and R=3, the steering-based collision avoidance to the right is determined as proper.

When the degree of easiness of steering-based collision avoidance has a equal value for both the left and the right, such as L=1 and R=1, the steering-based collision avoidance to the right is determined as proper, in the preceding determination. This determination is based on the estimation that the required lateral displacement to the right is smaller according to the lateral offset. When the degree of easiness of steering-based collision avoidance has different values for the left and the right, such as L<R, the steering-based collision avoidance to the left is determined as proper. This determination does not consider the lateral offset, that is, the required lateral displacement. In other words, when steering-based collision avoidance is possible through each of the both sides of the forward obstacle, the side of a smaller lateral displacement is determined as proper for collision-avoidance. When steering-based collision avoidance is possible only through one side or more highly possible through one side of the forward obstacle, the side is determined as proper for collision-avoidance, in no consideration of the required lateral displacement. In summary, the direction of steering-based collision avoidance is determined based on the lateral offset and the degree of easiness of steering-based collision avoidance.

In step S6, the required lateral displacement for steering-based collision avoidance is calculated, and a flag is set for a possibility of steering-based collision avoidance. In detail, lateral displacement calculating unit 17 calculates a required lateral displacement Y for steering-based collision avoidance, based on distance L, angles θ1 and θ2 derived in step S1, and the determination of the direction of steering-based collision avoidance in step S5.

When the determination in step S5 indicates that the left direction is proper for steering-based collision avoidance, the required lateral displacement Y for steering-based collision avoidance to the left is derived from the following equation (1).

$$Y = L \sin(\theta 2) + L_w/2 \tag{1}$$

where $L_w$ represents the overall width of the host vehicle (W1). In addition to the calculation of the lateral displacement Y, the flag for a possibility of steering-based collision avoidance is set to 1, which means steering-based collision avoidance to the left direction is possible.

When the determination in step S5 indicates that the right direction is proper for steering-based collision avoidance, the required lateral displacement Y for steering-based collision avoidance to the right is derived from the following equation (2).

$$Y = L \sin(\theta 1) + L_w/2 \qquad (2)$$

In addition to the calculation of the lateral displacement Y, the flag for a possibility of steering-based collision avoidance is set to 1, which means steering-based collision avoidance to the right direction is possible. As shown in FIG. 4, the lateral displacement Y in steering-based collision avoidance to the right is the distance between the left end of host vehicle 101 and the right end of forward obstacle 102.

When the determination in step S5 indicates that collision-avoidance is impossible in the both directions, the flag for a possibility of steering-based collision avoidance is set to 0, which means steering-based collision avoidance is impossible, without calculation of the lateral displacement Y.

In this way, even when the forward obstacle is offset relative to the host vehicle in the lateral direction, the required lateral displacement Y for steering-based collision avoidance can be calculated according to the lateral offset. This leads to a more precise determination of the possibility of steering-based collision avoidance.

The term of ($L_w/2$) in equations (1) and (2) is according to the assumption that forward-monitoring unit 1 (laser radar sensor) is attached to the center of the front of the vehicle with an overall width $L_w$. When forward-monitoring unit 1 is attached to the vehicle with an offset in the lateral direction, equations (1) and (2) need modifications of addition or subtraction of the offset.

In step S7, the possibility of steering-based collision avoidance is determined. First, steering-based avoidance determining unit 18 refers to the flag for the possibility of steering-based collision avoidance set in step S6. When the flag for the possibility of steering-based collision avoidance is 0, steering-based avoidance determining unit 18 determines that a collision can not be avoided by steering. On the other hand, when the flag for the possibility of steering-based collision avoidance is 1, steering-based avoidance determining unit 18 determines that a collision can be avoided by steering. In addition, a required time for lateral displacement $T_y$ (hereinafter referred as a lateral displacement required time) is calculated based on lateral displacement Y. Based on lateral displacement required time $T_y$, the possibility of steering-based collision avoidance is determined.

First, lateral displacement required time $T_y$ is calculated, based on lateral displacement Y derived in step S6. The calculation is operated in consideration of a steering characteristics. The steering characteristics is given by the following equations.

$$mV(r + d\beta/dt) = 2Y_F + 2Y_R \qquad (3)$$

$$I_z(dr/dt) = 2I_F Y_F - 2I_R Y_R \qquad (4)$$

$$Y_F = f_F(\beta + I_F r/V - \theta_F) \qquad (5)$$

$$Y_R = f_R(\beta + I_R r/V) \qquad (6)$$

where m represents a vehicle weight, $I_z$ represents a yaw moment of inertia, V represents a vehicle speed, r represents a yaw rate, $\beta$ represents a vehicle slip angle, $I_F$ represents a distance between a center of mass of the vehicle and a front axle, $I_R$ represents a distance between the center of mass of the vehicle and a rear axle, $Y_F$ represents a lateral force acted by the front wheels, and $Y_R$ represents a lateral force acted by the rear wheels. These values represents the state of the host vehicle.

$\theta_F$, a steering angle of the front wheels, is determined, based on the steering characteristics (steering speed, maximum steering angle) selected in step S4. $\theta_F$ represents the steering characteristics dependent on manual steering operation of a driver. For example, when a steering-based collision avoidance to the right is determined as proper in step S5 and the degree of easiness of steering-based collision avoidance to the right is R=1, the steering characteristics as shown in FIG. 5 is applied. When a steering-based collision avoidance to the left is determined as proper in step S5 and the degree of easiness of steering-based collision avoidance to the left is L=2, the steering characteristics as shown in FIG. 6 is applied.

Figure 7:
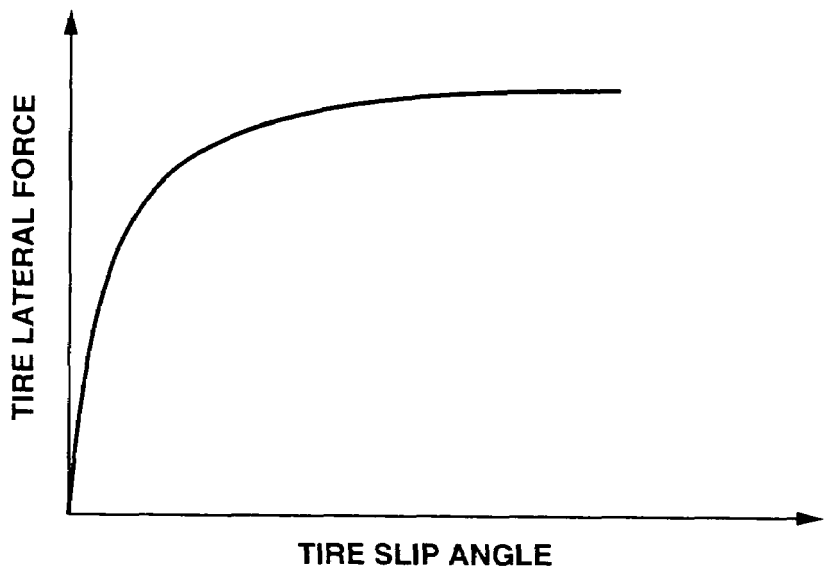
FIG. 7 is a characteristic diagram depicting a relationship between a tire lateral force and a tire slip angle.

$f_F$ and $f_R$ are functions which represent tire lateral forces according to tire slip angles. For instance, tire lateral forces or functions $f_F$ and $f_R$ are determined by the tire slip angles from a relationship as shown in FIG. 7.

With the preceding relationships, lateral displacement Y is represented by the following equation (7).

$$Y = \int V \sin(\int r dt + \beta) dt \qquad (7)$$

The preceding equations (3) through (7) are solved to derive lateral displacement required time $T_y$. In summary, lateral displacement required time $T_y$ is calculated in consideration of the steering characteristics dependent on manual steering operation of a driver and the steering characteristics dependent on the state of the host vehicle.

Figure 8:
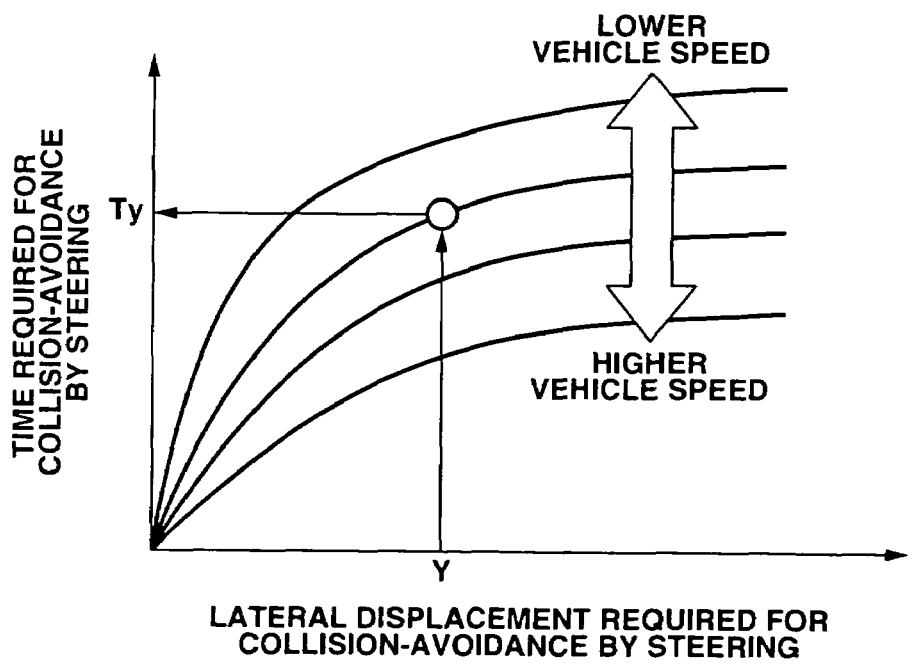
FIG. 8 is a map which is used to derive a lateral displacement required time $T_y$ from a vehicle speed and a required lateral displacement.

The preceding equations (3) through (7) may be calculated by off-line operation. The result of the calculation may be provided as a characteristic map for reference. FIG. 8 shows such a map. Applying the map shown in FIG. 8, lateral displacement required time $T_y$ is derived from lateral displacement Y with the vehicle speed as a parameter. When required time $T_y$ for lateral displacement Y required for collision-avoidance is calculated, the optimum lateral displacement required time $T_y$ is derived from vehicle speed V and lateral displacement Y referring such a map. In this way, lateral displacement required time $T_y$ can be derived in a shorter time than the calculation of the preceding equations (3) through (7) by on-line or on-time operation.

Next, the possibility of steering-based collision avoidance in lateral displacement required time $T_y$ is determined from the following equation (8).

$$L/V_r < T_y \qquad (8)$$

where ($L/V_r$) is an estimated collision time. When equation (8) is satisfied, steering-based collision avoidance is determined as impossible. On the other hand, when equation (8) is not satisfied, steering-based collision avoidance is determined as possible.

The possibility of steering-based collision avoidance is thus determined in step S7. Lateral displacement required time $T_y$, which is a determinant of the possibility of steering-based collision avoidance, is calculated in consideration of the steering characteristics dependent on manual steering operation of a driver and the steering characteristics dependent on the state of the host vehicle. In summary, the possibility of steering-based collision avoidance is determined in consideration of the steering characteristics dependent on manual steering operation of a driver and the steering characteristics dependent on the state of the host vehicle.

In step S8, the possibility of collision-avoidance by braking is determined. Brake-based avoidance determining unit 12 determines the possibility of brake-based collision avoidance, based on distance L and relative speed $V_r$ derived in step S1. For instance, when the following equation (9) is satisfied, brake-based collision avoidance is determined as impossible.

$$L < -V_r T_d + V_r^2/2a \tag{9}$$

where $T_d$ represents a delayed time when a deceleration actually occurs in operation of the brake pedal by a driver, taking a value such as 0.2 second, and a represents a deceleration generated by braking operation of a driver, taking a value such as 8.0 m/s².

In step S9, automatic brake control determining unit 19 determines whether steering-based collision avoidance is possible or not, according to the estimation of the possibility of steering-based collision avoidance in step S7. Automatic brake control determining unit 19 also determines whether brake-based collision avoidance is possible or not, according to the estimation of the possibility of brake-based collision avoidance in step S8. When steering-based collision avoidance and brake-based collision avoidance are both impossible, step S11 is operated. In the other cases, step S10 is operated.

In step S11, automatic braking by the second braking force is operated. This automatic braking is described later. Additionally, warning alarm 3 generates a warning sound which informs a driver of the operation of automatic braking control.

In step S10, automatic brake control determining unit 19 determines whether steering-based collision avoidance is possible or not, according to the estimation of the possibility of steering-based collision avoidance in step S7. Automatic brake control determining unit 19 also determines whether brake-based collision avoidance is possible or not, according to the estimation of the possibility of brake-based collision avoidance in step S8. When steering-based collision avoidance is impossible or brake-based collision avoidance is impossible, step S12 is operated. In the other cases, that is, when both steering-based collision avoidance and brake-based collision avoidance are possible, step S13 is operated.

In step S12, automatic braking by the first braking force is operated. This automatic braking is described later. In step S13, automatic braking is canceled. The following is a detailed description of automatic braking by the first braking force in step S12, automatic braking by the second braking force in step S11, cancellation of automatic braking in step S13. The automatic braking is operated by automatic brake control unit 2.

Figure 9:
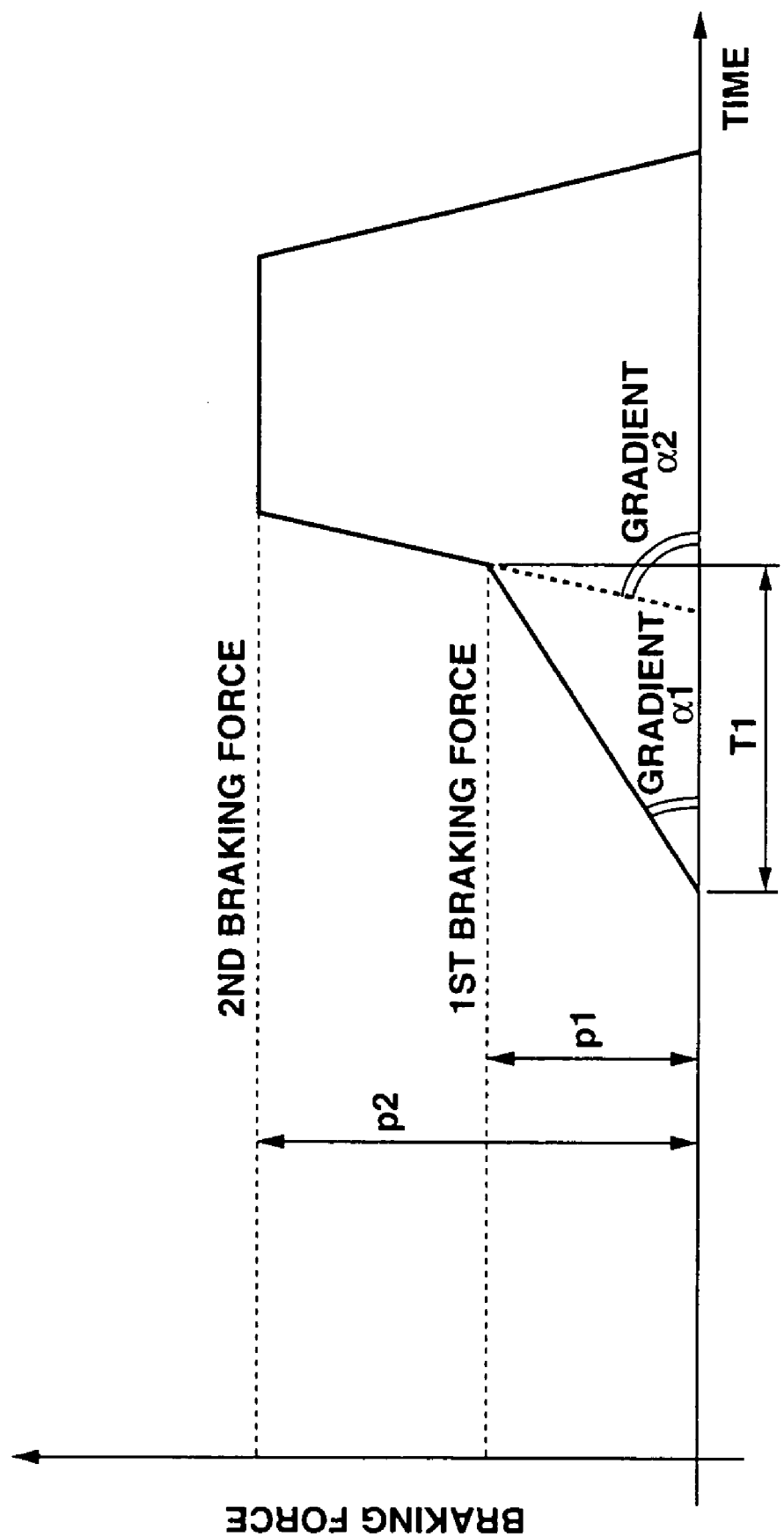
FIG. 9 is a graph depicting an automatic control employing the first braking force and the second braking force.

FIG. 9 shows a change of braking force, and the relationship between the first braking force and the second braking force. As shown in FIG. 9, in the first braking control, braking force increases by the first gradient α1 and reaches the first braking force p1. In the second braking control, braking force increases by the second gradient α2 which is larger than α1 and reaches the second braking force p2. The second braking control generally follows the first braking control. Gradient α1 is determined so that the first braking force p1 is not larger than a predetermined value in a shift from the first braking control to the second braking control. For example, the first gradient α1 is determined as follows.

First, time T1 from a start time of the first braking control to a start time of the second braking control (shown in FIG. 9) is estimated. When steering-based collision avoidance becomes impossible after brake-based collision avoidance, time T1 is calculated from the following equation (10) applying lateral displacement required time $T_y$ derived in step S7.

$$T1 = L/V_r - T_y \tag{10}$$

On the other hand, when brake-based collision avoidance becomes impossible after steering-based collision avoidance, time T1 is calculated from the following equation (11).

$$T1 = -(L - V_r^2/2a + V_r T_d)/V_r \tag{11}$$

where $T_d$ represents a delayed time when an actual deceleration occurs in operation of the brake pedal by a driver, and a represents a deceleration generated by braking operation of a driver.

Next, the first gradient α1 is calculated from the following equation (12), applying time T1 derived from equation (10) or (11).

$$\alpha 1 = p1/T1 \tag{12}$$

In step S12, the first braking control as described above is operated. In step S11, the second braking control as described above is operated. In step S13, the braking controls are canceled. In the cancellation of the braking control, braking force is gradually decreased by a predetermined gradient.

The following is an overall operation of the system. The automatic brake system for a vehicle obtains a longitudinal distance, a vehicle speed, and a lateral offset relative to an obstacle preceding the vehicle (step S1). In addition, avoidance space widths W2_L and W2_R on the sides of the forward obstacle are obtained (step S2). The degree of easiness of steering-based collision avoidance to each of the both sides is obtained, based on left avoidance space width W2_L, right avoidance space width W2_R, and host vehicle width W1. The degree of easiness of steering-based collision avoidance is categorized as either one of "steering-based collision avoidance is easy", "steering-based collision avoidance is difficult", and "steering-based collision avoidance is impossible" (step S3). The steering characteristics is estimated, based on the degree of easiness of steering-based collision avoidance (step S4). The direction of steering-based collision avoidance is determined, based on angles θ1 and θ2 corresponding to the lateral offset, and the degree of easiness of steering-based collision avoidance (step S5). Lateral displacement Y required for steering-based collision avoidance is calculated, based on the direction of steering-based collision avoidance, the longitudinal distance L and the lateral offset relative to the forward obstacle (step S6). A flag is set according to the possibility of steering-based collision avoidance (the flag is set to 1 when steering-based collision avoidance is possible). The possibility of steering-based collision avoidance is finally determined, based on the flag for the possibility of steering-based collision avoidance, lateral displacement Y, the steering characteristics, and lateral displacement required time $T_y$ (step S7). On the other hand, the possibility of brake-based collision avoidance is determined, based on longitudinal distance L and relative speed $V_r$ (step S8). Finally, the braking control by the first braking force, the braking control by the second braking force, and the cancellation of the controls are operated, based on the determination of the possibilities of steering-based collision avoidance and brake-based collision avoidance (step S9 to S13).

The following is effects of the operations of the system. The possibility of steering-based collision avoidance is determined in consideration of the steering characteristics dependent on manual steering operation of a driver and the steering characteristics dependent on the state of the host vehicle. Accordingly, the possibility of steering-based collision avoidance is determined with precision. Therefore braking control for collision-avoidance can be operated at the optimum timing. Specifically, braking control for collision-avoidance can be operated at the optimum timing, in consideration of different steering characteristics according to vehicle specifications and/or vehicle speeds.

Required time for steering-based collision avoidance (lateral displacement required time $T_y$) is calculated in consideration of a characteristics of steering operation of a driver in an emergency. Accordingly, time for steering-based collision avoidance in an emergency is calculated precisely. Therefore braking control for collision-avoidance can be operated at the optimum timing. The possibility of steering-based collision avoidance is determined, based on avoidance space widths W2_L, W2_R on the sides of the forward obstacle. Thus, the possibility of steering-based collision avoidance can be determined, in consideration of a road condition such as a condition where infrastructures such as guard rails and side walls, or vehicles are in the path of avoidance, and avoidance space width.

When steering-based collision avoidance is possible only through one side or more highly possible through one side of the forward obstacle, the side is determined as proper for a collision-avoidance, in no consideration of the required lateral displacement. Thus, the possibility of steering-based collision avoidance is determined according to actual road conditions. For example, conventionally, the possibility of steering-based collision avoidance is determined as to a direction where required lateral displacement is smaller, according to the criteria of lateral displacement. The possibility of steering-based collision avoidance for the direction where is actually no possibility may be estimated or determined. For instance, a direction where avoidance space is inadequate may be estimated. The determination of the impossibility of steering-based collision avoidance is delayed accordingly, which leads to a trouble of inadequate deceleration for collision-avoidance. However, in the present invention, when steering-based collision avoidance is possible only through one side or more highly possible thorough one side of the forward obstacle, the side is determined as proper for collision-avoidance, in no consideration of the required lateral displacement. Consequently, it is prevented that such delay of the determination of the impossibility of steering-based collision avoidance leads to inadequate deceleration for collision-avoidance.

On the other hand, when steering-based collision avoidance is possible through each of the both sides of the forward vehicle, the side of a smaller lateral displacement is determined as proper for a collision-avoidance. Thus, when steering-based collision avoidance is possible through each of the both sides of the forward vehicle, the determination according to a criteria of the estimated lateral displacement leads to a precise determination of the possibility of steering-based collision avoidance. Consequently, unnecessary deceleration for collision-avoidance can be prevented from operating to annoy or irritate a driver.

While the foregoing is a description of the preferred embodiments carried out the invention, it will be understood that the invention is not limited to the particular embodiments shown and described herein. In the embodiment, the steering characteristics of which the possibility of steering-based collision avoidance is determined in consideration includes both the steering characteristics dependent on manual steering operation of a driver and the steering characteristics dependent on the state of the host vehicle. However the invention is not limited to this configuration. The steering characteristics of which the possibility of steering-based collision avoidance is determined in consideration may consist of either one of the steering characteristics dependent on manual steering operation of a driver or the steering characteristics dependent on the state of the host vehicle. In this case, lateral displacement required time $T_y$ is calculated, for example, where the steering characteristics of no consideration is fixed as a constant.

In the embodiment, braking control for collision-avoidance is operated, based on both the determination of the possibility of steering-based collision avoidance and the determination of the possibility of brake-based collision avoidance. However the invention is not limited to this configuration. An automatic brake system for a vehicle may determine only the possibility of steering-based collision avoidance, and operate braking control, based on the determination.

In the embodiment, the degree of easiness of steering-based collision avoidance is categorized in three levels. In addition, the steering characteristics dependent on manual steering operation of a driver is categorized in two cases (FIGS. 5 and 6) according to the categorization of the degree of easiness of steering-based collision avoidance. However the invention is not limited to this configuration. The degree of easiness of steering-based collision avoidance may be categorized in multiple levels over three levels. The steering characteristics dependent on manual steering operation of a driver may be categorized in more various cases accordingly. In this way, based on conceiving various maneuvers of a driver for collision-avoidance more precisely, the possibility of steering-based collision avoidance can be determined.

In the embodiment, forward-monitoring unit 1 is a scanning type laser radar sensor. However the invention is not limited to this configuration. Forward-monitoring unit 1 only needs to be a device which monitors a road condition in front of the host vehicle or a condition of the path where the host vehicle is traveling. Forward-monitoring unit 1 may be a device such as a millimeter wave radar sensor and an infrared radar sensor.

In the embodiment, steering-based avoidance determining unit 18 is served to determine the steering characteristics dependent on the state of the host vehicle. Steering characteristics determining unit 15 is served as a means for determining the steering characteristics. Steering-based avoidance determining unit 18 is served as a means for determining a possibility that the vehicle can avoid the potential collision with the obstacle by steering, passing on sides of the obstacle, based on the steering characteristics determined by the steering characteristics determining means. Brake-based avoidance determining unit 12 is served as a means for determining a possibility that the vehicle can avoid the potential collision with the obstacle by braking, based on the geometrical relationship. Automatic brake control determining unit 19 and automatic brake control unit 2 are served as a means for determining the braking control operation to avoid the potential collision with the obstacle, based on the possibility determined by the steering-based avoidance determining unit and the possibility determined by the brake-based avoidance determining unit. Avoidance space width detecting unit 13 is served as a means for detecting widths of spaces on the sides of the obstacle. Steering-based avoidance easiness determining unit 14 is served as a means for determining a degree of easiness with which the vehicle can avoid the potential collision with the obstacle by steering, based on the widths of the spaces on the sides of the obstacle and a width of the vehicle.

The entire contents of Japanese Patent Application No. 2003-092160 (filed Mar. 28, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automatic brake system for a vehicle comprising:
a forward-monitoring unit that automatically detects an obstacle preceding the vehicle; and
a control unit that varies an assumed characteristic of manual steering operation in accordance with a condition of a path where the vehicle is traveling and executes an automatic braking control operation to avoid a potential collision with the obstacle, based on the assumed manual steering operation characteristic,
wherein the assumed manual steering operation characteristic that is varied comprises at least one of a maximum steering angle and a steering speed.

2. The automatic brake system as claimed in claim 1, wherein:
the control unit comprises:
a steering characteristic determining unit that determines the assumed manual steering operation characteristic;
a steering-based avoidance determining unit that determines a possibility that the vehicle can avoid the potential collision with the obstacle by steering, passing on either side of left and right sides of the obstacle, based on the assumed manual steering operation characteristic determined by the steering characteristic determining unit;
a brake-based avoidance determining unit that determines a possibility that the vehicle can avoid the potential collision with the obstacle by braking; and
an automatic brake control determining unit that executes the automatic braking control operation to avoid the potential collision with the obstacle, based on the possibility determined by the steering-based avoidance determining unit and the possibility determined by the brake-based avoidance determining unit.

3. The automatic brake system as claimed in claim 2, wherein:
the control unit further comprises an avoidance space width detecting unit that detects widths of spaces on the sides of the obstacle; and
the steering-based avoidance determining unit determines the possibility that the vehicle can avoid the potential collision with the obstacle by steering, based on the widths of the spaces on the sides of the obstacle.

4. The automatic brake system as claimed in claim 3, wherein:
the control unit further comprises a steering-based avoidance easiness determining unit that determines a degree of easiness with which the vehicle can avoid the potential collision with the obstacle by steering, based on the widths of the spaces on the sides of the obstacle and a width of the vehicle; and the steering-based avoidance determining unit determines the possibility that the vehicle can avoid the potential collision with the obstacle by steering, based on the degree of easiness.

5. The automatic brake system as claimed in claim 2, wherein:
the control unit further comprises a lateral displacement calculating unit that determines a lateral displacement required for a steering-based collision avoidance to each of the sides of the obstacle, based on the condition of the path where the vehicle is traveling detected by the forward-monitoring unit; and
the steering-based avoidance determining unit determines the possibility that the vehicle can avoid the potential collision with the obstacle by steering, based on the lateral displacements determined by the lateral displacement calculating unit.

6. The automatic brake system as claimed in claim 5, wherein:
the control unit further comprises:
an avoidance space width detecting unit that detects widths of spaces on the sides of the obstacle; and
a steering-based avoidance easiness determining unit that determines a degree of easiness with which the vehicle can avoid the potential collision with the obstacle by steering, based on the widths of the spaces on the sides of the obstacle and a width of the vehicle;
the steering-based avoidance determining unit determines the possibility that the vehicle can avoid the potential collision with the obstacle by steering, based on the degree of easiness with which the vehicle can avoid the potential collision with the obstacle by steering determined by the steering-based avoidance easiness determining unit; and
the steering-based avoidance determining unit determines the possibility that the vehicle can avoid the potential collision with the obstacle by steering, based on the lateral displacements determined by the lateral displacement calculating unit, only when the possibility that the vehicle can avoid the potential collision with the obstacle by steering determined by the steering-based avoidance determining unit is positive for both sides of the obstacle.

7. The automatic brake system as claimed in claim 6, wherein:
the steering-based avoidance determining unit determines the possibility that the vehicle can avoid the potential collision with the obstacle by steering, only for a side of the obstacle where the lateral displacement determined by the lateral displacement calculating unit is smaller than on another side.

8. An automatic brake system for a vehicle comprising:
forward-monitoring means for automatically detecting an obstacle preceding the vehicle; and
control means for varying an assumed characteristic of manual steering operation in accordance with a condition of a path where the vehicle is traveling and executing an automatic braking control operation to avoid a potential collision with the obstacle, based on the assumed manual steering operation characteristic,
wherein the assumed manual steering operation characteristic that is varied comprises at least one of a maximum steering angle and a steering speed.

9. An automatic brake system for a vehicle comprising:
a forward-monitoring unit that automatically detects an obstacle preceding the vehicle, and a geometrical relationship among the vehicle, the obstacle and a path where the vehicle is traveling;
a control unit that varies an assumed characteristic of manual steering operation in accordance with a condition of the path where the vehicle is traveling and executes an automatic braking control operation to avoid a potential collision with the obstacle, based on the assumed manual steering operation characteristic and the geometrical relationship; and a brake control unit that generates a braking force according to the automatic braking control operation determined by the control unit, wherein the assumed manual steering operation characteristic that is varied comprises at least one of a maximum steering angle and a steering speed.

10. The automatic brake system as claimed in claim 9, wherein:

the control unit comprises a steering characteristic determining unit that determines the assumed manual steering operation characteristic, based on a degree of easiness with which the vehicle can avoid the potential collision with the obstacle by steering.

11. The automatic brake system as claimed in claim 10, wherein:

the steering characteristic determining unit determines the assumed manual steering operation characteristic in which the maximum steering angle is larger and the steering speed is faster, when the degree of easiness is higher; and the steering characteristic determining unit determines the assumed manual steering operation characteristic in which the maximum steering angle is smaller and the steering speed is slower, when the degree of easiness is lower.

12. The automatic brake system as claimed in claim 10, wherein:

the control unit further comprises a steering-based avoidance easiness determining unit that determines the degree of easiness with which the vehicle can avoid the potential collision with the obstacle by steering, based on widths of spaces on sides of the obstacle and a width of the vehicle.

13. The automatic brake system as claimed in claim 9, wherein:

the control unit comprises:

a steering characteristic determining unit that determines the assumed manual steering operation characteristic;

a steering-based avoidance determining unit that determines a possibility that the vehicle can avoid the potential collision with the obstacle by steering, passing on sides of the obstacle, based on the assumed manual steering operation characteristic determined by the steering characteristic determining unit; and an automatic brake control determining unit that determines the automatic braking control operation to avoid the potential collision with the obstacle, based on the possibility determined by the steering-based avoidance determining unit.

14. The automatic brake system as claimed in claim 9, wherein:

the control unit comprises:

a steering characteristic determining unit that determines the assumed manual steering operation characteristic;

a steering-based avoidance determining unit that determines a possibility that the vehicle can avoid the potential collision with the obstacle by steering, passing on either one of left and right sides of the obstacle, based on the assumed manual steering operation characteristic determined by the steering characteristic determining unit;

a brake-based avoidance determining unit that determines a possibility that the vehicle can avoid the potential collision with the obstacle by braking, based on the geometrical relationship; and an automatic brake control determining unit that determines the automatic braking control operation to avoid the potential collision with the obstacle, based on the possibility determined by the steering-based avoidance determining unit and the possibility determined by the brake-based avoidance determining unit.

15. The automatic brake system as claimed in claim 14, wherein:

the automatic brake control determining unit determines to operate the braking force when the possibility determined by the steering-based avoidance determining unit and the possibility determined by the brake-based avoidance determining unit are both positive.

16. The automatic brake system as claimed in claim 14, wherein:

the control unit further comprises an avoidance space width detecting unit that detects widths of spaces on the sides of the obstacle; and the steering-based avoidance determining unit determines the possibility that the vehicle can avoid the potential collision with the obstacle by steering, based on the widths of the spaces on the sides of the obstacle.

17. The automatic brake system as claimed in claim 16, wherein:

the control unit further comprises a steering-based avoidance easiness determining unit that determines a degree of easiness with which the vehicle can avoid the potential collision with the obstacle by steering, based on the widths of the spaces on the sides of the obstacle and a width of the vehicle; and the steering-based avoidance determining unit determines the possibility that the vehicle can avoid the potential collision with the obstacle by steering, based on the degree of easiness.

18. The automatic brake system as claimed in claim 14, wherein:

the control unit further comprises a lateral displacement calculating unit that determines a lateral displacement required for a steering-based collision avoidance to each of the sides of the obstacle, based on the condition of the path where the vehicle is traveling detected by the forward-monitoring unit; and the steering-based avoidance determining unit determines the possibility that the vehicle can avoid the potential collision with the obstacle by steering, based on the lateral displacements determined by the lateral displacement calculating unit.

19. The automatic brake system as claimed in claim 18, wherein:

the control unit further comprises:

an avoidance space width detecting unit that detects widths of spaces on the sides of the obstacle; and a steering-based avoidance easiness determining unit that determines a degree of easiness with which the vehicle can avoid the potential collision with the obstacle by steering, based on the widths of the spaces on the sides of the obstacle and a width of the vehicle;

the steering-based avoidance determining unit determines the possibility that the vehicle can avoid the potential collision with the obstacle by steering, based on the degree of easiness with which the vehicle can avoid the potential collision with the obstacle by steering determined by the steering-based avoidance easiness determining unit; and the steering-based avoidance determining unit determines the possibility that the vehicle can avoid the potential collision with the obstacle by steering, based on the lateral displacements determined by the lateral displacement calculating unit, only when the possibility that the vehicle can avoid the potential collision with the obstacle by steering determined by the steering-based avoidance determining unit is positive for both sides of the obstacle.

20. The automatic brake system as claimed in claim 19, wherein:

the steering-based avoidance determining unit determines the possibility that the vehicle can avoid the potential collision with the obstacle by steering, only for a side of the obstacle where the lateral displacement determined by the lateral displacement calculating unit is smaller than on another side.

21. The automatic brake system as claimed in claim 14, wherein:

the control unit further comprises a lateral displacement calculating unit that determines a lateral displacement required for a steering-based collision avoidance to each side of the obstacle, based on the condition of the path where the vehicle is traveling detected by the forward-monitoring unit;

the steering-based avoidance determining unit determines a required time for the lateral displacement, based on the condition of the path where the vehicle is traveling detected by the forward-monitoring unit; and the steering-based avoidance determining unit determines the possibility that the vehicle can avoid the potential collision with the obstacle by steering, based on the required time for the lateral displacement, a longitudinal distance between the vehicle and the obstacle, and a relative speed of the vehicle to the obstacle.

\* \* \* \* \*